United States Patent [19]

Knoess

[11] Patent Number: 5,356,721
[45] Date of Patent: Oct. 18, 1994

[54] COMPONENT FOR NOISE-DAMPED TRANSMISSION

[75] Inventor: Walter Knoess, Füssen, Fed. Rep. of Germany

[73] Assignee: Sinterstahl Gesellschaft m.b.H., Fuessen, Fed. Rep. of Germany

[21] Appl. No.: 159,041

[22] Filed: Nov. 29, 1993

Related U.S. Application Data

[63] Continuation of Ser. No. 992,454, Dec. 17, 1992, abandoned.

[30] Foreign Application Priority Data

Apr. 4, 1992 [DE] Fed. Rep. of Germany ....... 4211318

[51] Int. Cl.$^5$ ................................................ B22F 5/08
[52] U.S. Cl. .................................... 428/347; 428/550; 428/552; 428/556; 419/5; 419/8; 419/12
[58] Field of Search ............... 428/547, 550, 552, 556; 419/5, 8, 12

[56] References Cited

U.S. PATENT DOCUMENTS

| | | | |
|---|---|---|---|
| 2,704,465 | 3/1955 | Haller | 74/434 |
| 5,016,348 | 5/1991 | Knoess | 29/888.1 |

FOREIGN PATENT DOCUMENTS

| | | | |
|---|---|---|---|
| 0097027 | 12/1983 | European Pat. Off. | B22F 3/16 |
| 2310536 | 1/1974 | Fed. Rep. of Germany . | |
| 3007008 | 8/1980 | Fed. Rep. of Germany . | |
| 3839800 | 5/1990 | Fed. Rep. of Germany . | |
| 63-043062 | 2/1988 | Japan | F16H 55/14 |

*Primary Examiner*—Donald P. Walsh
*Assistant Examiner*—John N. Greaves
*Attorney, Agent, or Firm*—Morgan & Finnegan

[57] ABSTRACT

It is the object of the invention to reduce the propagation of noises, in particular shifting noises, in mechanical transmissions. The invention consists in the use of a sintered shaped part formed in an individualized configuration as a noise-damped component, and in particular a gearwheel for a transmission. In the novel configuration, an axially symmetrical sintered shaped part has individual, approximately annular zones of material, for example, an inner rim zone close to the axis and an outer rim zone remote from the axis, the inner and outer rim zones having a high strength and being largely free from voids and a central region being highly porous and comparatively ductile.

7 Claims, No Drawings

COMPONENT FOR NOISE-DAMPED TRANSMISSION

This is a continuation of co-pending application Ser. No. 07/992,454, filed on Dec. 17, 1992, now abandoned.

FIELD OF THE INVENTION

The invention relates to a noise-damping component, such as a gearwheel, for use in mechanical transmissions, e.g. manually shifted motor-vehicle transmissions, wherein an axially symmetrical sintered shaped part having individual, approximately concentric zones of material is used for the noise-damping component.

BACKGROUND

The further development of manually shifted transmissions and differentials is still an area of primary concern in the automobile industry. Along with increasing the ease of shifting gears; reducing the dimensions of the transmission; and lowering the power losses in transmissions, measures for containing or reducing the noises from the transmission continue to merit a high priority. To date, measures for reducing transmission noise have extended to achieving ever higher precision in toothing geometries and focusing upon the noise-damped mounting of the transmission unit as a whole focusing to adjoining units in the motor vehicle. Development work is also continuing on constructional measures to facilitate synchronization of transmission components upon shifting so as to reduce the shifting noises which actually occur.

In the noise-damping construction of machines and other units, extensive use is made of components with a composite structure. That is to say, the components made up of composites display zones of different material composition and/or structure. Composite structures include both components which exhibit improvement of the surface of the material, e.g. a surface coating, and those in which a number of individual parts composed of different materials are subjected to a joining operation, e.g. by welding, adhesive bonding or a mechanical shrink-on operation, in order to construct a single component.

It is, in particular, also known, by using sinter metallurgy, to integrally convert components produced by various methods to components with zones of different materials and/or structures, or to otherwise reconfigure them by appropriate after treatments.

The aforementioned measures are a means of reconciling the different property requirements in the various zones of a component, be these of a mechanical or chemical nature, against the commercial requirement of minimizing material and process costs. In many cases, it is possible in this way to stretch the limits of what is technically feasible.

Examples of this can be found from the nearest-related prior art which is to be taken into account.

DE 23 10 536 A1 (entitled "Process for the production of objects made of composite metal") describes a process in which a core comprising already compacted metal powder is surrounded with a metal powder—in general of a different type—and the unit thus formed is compacted. The aim of the process is to give a product with a hard, abrasion-resistant exterior and a relatively tough, easily machinable interior (page 2, paragraph 3). Hubs with a hard central region or gear cutters with a "foot of relatively tough material" and an "extremely hard toothed surface" are mentioned as examples of such products.

Another example is DE 30 07 008 C2 entitled "wear-resistant part for internal combustion engines and a process for its manufacture". The wear-resistant part comprises a main body of iron or steel and a sintered body composed of a specific iron alloy and having certain void characteristics, joined intimately to the main body by sintering. Here too, the aim of the measures is to provide a component "with a high toughness in its body and a high abrasion-resistance in at least one portion of its surface" (column 2, lines 41–44).

Common to the above-described previously known embodiments of employing a sintered shaped part as a component is the fact that although they display high-strength rim zones having few voids or being largely void-free, they do not have a highly porous central region composed of comparatively ductile material. On the contrary, these processes presented are only suitable of producing, in an economical manner, sintered bodies with 90% or more of the theoretical density, even in the central region. They are not aimed at guaranteeing high porosity in the central region in combination with a high rim density.

U.S. Pat. No. 2,561,579 describes a gearwheel produced by powder metallurgy and composed of an impregnated ferrous material. Partial areas of the gearwheel are impregnated with a melt consisting of copper or copper alloys in order to increase the strength in these areas or to modify the physical properties of these partial areas. The problem of noise damping is neither addressed by the patent nor achieved in a closely related manner by means of the embodiments specified in the patent.

OBJECTS TO THE INVENTION

Accordingly, it is an object of the present invention to provide measures or methods for noise damping or noise reduction in gear mechanisms and differentials, and in particular in the construction of manually shifted motor-vehicle transmissions. The object relates to providing components which, as far as possible, limit the evolution of noise which inevitably occurs during the rolling contact of pairs of hard tooth flanks of metallic parts of the transmission to the zones, and which reduces the transmission of structure-borne noise to adjoining subassemblies.

SUMMARY OF THE INVENTION

This object is achieved according to the invention by the use of means known per se but in a novel configuration as a noise-damped component in mechanical transmissions. The component configured according to the invention is an axially symmetrical sintered shaped part with an approximately annular central region, an inner rim zone close to the axis, and an outer rim zone remote from the axis. The rim zones have a high strength and are largely free from voids in the material forming them. By contrast, the central annular region is composed of a highly porous, comparatively ductile material, with the proviso that the volume of voids in the central region is more than 10 to 50% by volume of the material forming the central region. The invention may employ multiple radially successive, e.g., more than three, zones of different material composition.

DETAILED DESCRIPTION OF THE INVENTION

There are a multiplicity of known processes available to the person skilled in the art for producing high-strength and high-density zones in an otherwise highly porous sintered shaped part. These processes differ markedly from the sintering technique in powder metallurgy by which mass-produced components such as gear wheels, where strength is normally a crucial factor, are normally produced. Preferred novel uses of the axially symmetrical sintered shaped part are presented in the sub-claims.

The influence which material porosity, mechanical strength and long-term rupture strength have on one another is nowadays known in powder metallurgy; the appropriate methods of influencing them are also sufficiently well established that it is possible to design and manufacture sintered shaped parts specific to requirements for a useful range of applications at an acceptable cost.

Thus, it is possible to calculate the maximum permissible porosities for specific component strengths and various dimensions and materials at acceptable cost by means of the finite element method.

The elasticity modulus and specific density ($\rho$) of a material are, as is known, of essential significance to the propagation or damping of sound in the material. Materials with a relatively small elasticity modulus exhibit greater sound damping at relatively high sound frequencies ($v$). The frequency spectrum of the noise of the transmission is shifted toward smaller frequencies. The sound intensity, which is decisive for the propagation of the sound, changes in proportion to the density ($\rho$) and as the square of the frequency ($v$).

In line with their use, the novel components are manufactured predominantly from ferrous materials. Components of this kind composed of ferrous materials are generally produced by pressing the powder and then sintering it while approximately maintaining the porosity values, and, in certain cases, by additional recompaction. It has also been found that it is preferable for the elasticity modulus of the central region be lower than that of hardened forged steel (which is approximately $6 \times 10^{11}$ Pa).

The zones of different densities can be achieved either by simultaneous pressing of different powder materials in the individual zones, or by aftertreatment of an originally homogeneous sintered shaped part by superficial infiltration or diffusion of additional materials into the basic matrix of the porous base material, in certain cases involving reactions or alloying with the base material. The use of special volatile and non-volatile pore-forming materials is also known. When iron-base materials are used, metallic additives such as nickel, manganese and copper, and non-metallic additives such as phosphorus or boron have proven particularly suitable as solid additional materials for the manufacture of high-strength rim zones.

This group of additional materials does not include nitrogen- or carbon-containing gases, for example, which produce carburization or nitrogen hardening in ferrous materials, further increasing the elasticity modulus of the rim zone.

A further group of measures for subsequent compaction of moderately porous sintered shaped parts comprises mechanical methods, such as sizing of the shaped parts, so that it is specifically the surface zones which are further compacted or highly compacted.

In practice, high-strength non-porous rim zones are preferably formed by combination methods in which, on the one hand, additional materials are introduced into the rim zone of the sintered shaped part to reduce the porosity of the basic sintered material and, on the other hand, the high-strength, largely void-free rim zones are produced by means of mechanical recompaction and/or by sizing or even, for example, by hot-isostatic recompaction of the sintered shaped parts.

The central region of the sintered shaped part can, but need not, have a uniform porosity, structure and material composition. On the contrary, it can be composed of individual annular regions in states which change abruptly or gradually.

The noise damping which can be achieved for gearwheels in accordance with the present invention as compared with hither-to disclosed embodiments is considerable. In view of the unavoidably high strength requirements specified in the construction of transmissions for the region of the toothed flanks, it is also surprising. To date, forged materials with particularly high elasticity moduli and particularly high mechanical strengths have been used in gearwheels, as is known. The unavoidable consequence of such materials is high noise evolution in operation. The exclusive use of forged dense materials of high strength and hardenability hitherto blocked the way to the novel solution of the sound and noise problem in motor-vehicle transmissions. There was hitherto no relevant empirical relation, and thus, there was no prior indication for a person skilled in the art that the density and strength (elasticity modulus) of the material of a gearwheel could be reduced in the central region, compared to the edge region, to such an extent by means of measures taken from sinter metallurgy—and without the risk of concomitant disadvantages occurring because of such reduction—so that an abrupt improvement in noise damping would be achieved. Indeed, it was found in an unforeseeable manner that the qualities of adequate toughness or ductility, high porosity, sufficient mechanical strength, and dimensional stability of the sintered shaped part, relative to the compressed powder charge, for the intended use of the component, are not mutually exclusive.

Since gearwheels produced by powder metallurgy are increasingly being used for load bearing and meshing in transmission applications, the advantageous noise damping which sintered gearwheels of the novel design and configuration provide is also gaining importance.

I claim:

1. A noise damping component for mechanical transmissions, comprising: an axially symmetrical sintered shaped part having a plurality of individual concentric zones of material, said shaped part having a central region, an inner rim zone close to the axis of symmetry, and an outer rim zone remote from the axis of symmetry, the rim zones formed from a material having a high strength and being largely free from voids and the central region being formed of a highly porous, comparatively ductile material, wherein the central region has a void volume of more than 10 to 50% by volume of the material forming said central region.

2. The noise damping component as claimed in claim 1, wherein the central region has an elasticity modulus lower than that of hardened forged steel.

3. The noise damping component as claimed in claim 1, wherein the sintered shaped part is composed of a material based on iron.

4. The noise damping component as claimed in claim 1, wherein the sintered shaped part has more than three radially successive zones of different material composition.

5. The noise damping component as claimed in claim 1, wherein the central region has individual concentric regions of different porosity and material composition.

6. The noise damping component as claimed in claim 1, wherein said sintered shaped part is composed of a uniform porous base material with one or more additional materials within said individual concentric zones.

7. The noise damping component as claimed in claim 6, wherein the base material is an iron-base material and the additional materials are from the group consisting of manganese, phosphorus and/or boron.

* * * * *